April 15, 1952  E. E. BRAY  2,593,391
FLUOROMETER FOR MEASUREMENT OF FLUORESCENCE OF UNEVEN SURFACES
Filed March 2, 1950   3 Sheets-Sheet 1

ELLIS E. BRAY
INVENTOR.

BY D. Carl Richards
AGENT

April 15, 1952        E. E. BRAY        2,593,391
FLUOROMETER FOR MEASUREMENT OF FLUORESCENCE OF UNEVEN SURFACES
Filed March 2, 1950        3 Sheets-Sheet 3

ELLIS E. BRAY
INVENTOR.

BY D. Carl Richards

AGENT

Patented Apr. 15, 1952

2,593,391

UNITED STATES PATENT OFFICE 2,593,391

FLUOROMETER FOR MEASUREMENT OF FLUORESCENCE OF UNEVEN SURFACES

Ellis E. Bray, Cedar Hill, Tex.

Application March 2, 1950, Serial No. 147,184

13 Claims. (Cl. 250—53)

This invention relates to the measurement of fluorescence of selected liquids or solids and more particularly to an instrument for the measurement of fluorescence of soil samples, well cuttings, or well cores obtained in the exploration for oil and the drilling of oil wells.

Fluorescent studies of various materials are well known and widely used. For example, in exploration and prospecting, variations in the fluorescent properties of minerals has long been used both to locate mineral deposits and after their location to follow such deposits during mining operation. The fluorescence of samples of soil has been considered to be a likely parameter for detection of oil fields in geochemical prospecting since hydrocarbons are known to fluoresce. In the process of drilling wells for oil, it has, in some instances, been possible to distinguish between oil-gas, oil-water, and gas-water contacts on the basis of fluorescence of samples of well cuttings. However, there has been no provision on field instruments for obtaining precise measurements. Only rough comparisons of the relative intensity of fluorescence of the samples based wholly on visual observation have been possible.

By the present invention, there is provided a fluorometer in which the intensity of the fluorescence may readily be measured electronically in relation to a calibrated fluorescent standard whereby values obtained are a direct and accurate measurement of the intensity of fluorescence of the samples. The values obtained for a plurality of such measurements may thus be compared quantitatively one with another.

For further objects and advantages, reference may now be had to the following description taken in conjunction with the accompanying drawings in which.

Measurement of the fluorescence of rough samples such as are obtained in the field may be wholly unreliable for the reason that the intensity of the radiation detected by a photocell is inversely proportional to the square of the distance between the sample and the photocell and is directly proportional to the cosine of the angle of incidence of the exciting energy. If a sample of rock or of cuttings is not carefully machined or compacted as to present a substantially flat and uniform surface to the excitation and to the detector of fluorescence, the measurement obtained will be critically dependent upon the orientation of the various reflecting faces on the surface of the sample. In the present invention, the system is so devised that measurements of fluorescence may be obtained on relatively rough-surface samples, i. e., cores, rocks, cuttings, etc., which are accurate to within ±5 percent without special preparation. The foregoing accuracy is achieved by providing a distributed source of excitation so that the ultraviolet light impinges the sample from all directions and thus attenuates or reduces variations due to different orientations. In effect, by providing a distributed source in the manner hereinafter more fully explained, the area of the sample exposed to radiation is effectively averaged so far as a detector circuit is concerned so that for any of a plurality of orientations of a given sample the detected intensity of fluorescence will not vary more than indicated above.

Figure 1:
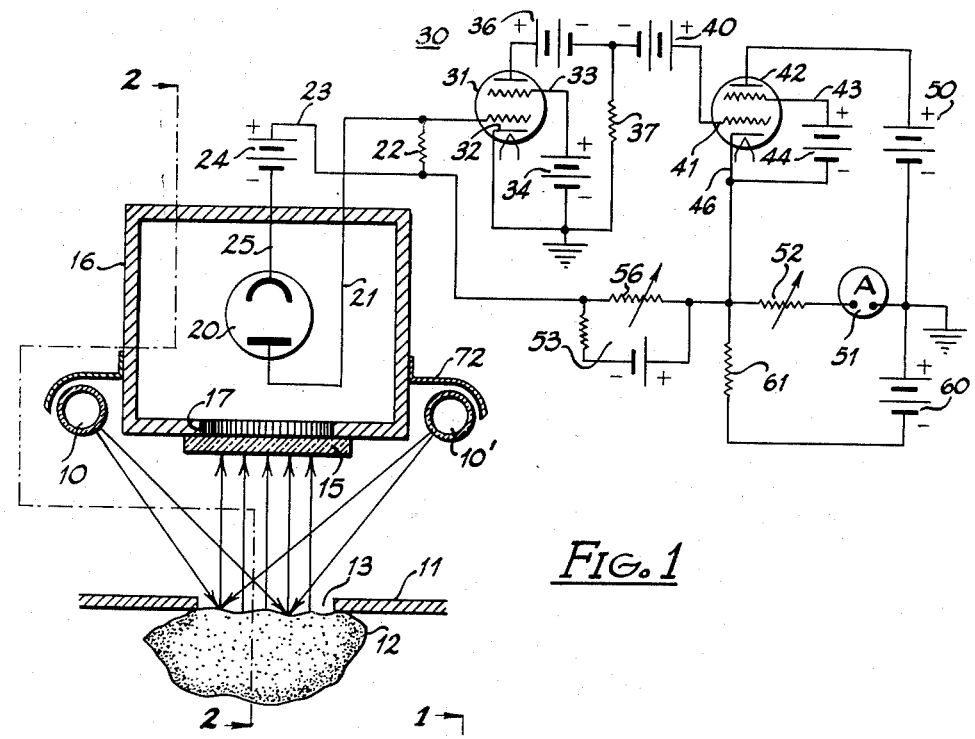
Fig. 1 is a diagrammatic sectional view of the fluorometer taken along the line 1—1 of Fig. 2 and includes a schematic diagram of the detecting circuit.

Referring now to Fig. 1, there has been illustrated in section one form of the fluorometer of the present invention with the detecting and measuring circuit associated therewith illustrated schematically. The fluorometer comprises two sources 10 and 10' of ultraviolet light positioned within a light-tight housing (not shown) but which includes as one side thereof an apertured plate 11 (shown in part). Light from the sources 10 and 10' irradiates the plate 11 and exposes sample 12, placed outside of the housing and adjacent the aperture 13, to ultraviolet radiations. The sample 12 thereupon fluoresces in amount dependent upon the distance from the source 10 to the surface of the sample, the cosine of the angle of the incidence of the radiation from the sources 10 and 10' and the intrinsic properties of the sample itself. It is, of course, desirable to obtain measurements of the fluorescence of the sample dependent only upon the latter factor and independent of variations that may be caused by orienting the sample in different positions.

Visible fluorescent light from the sample 12 passes through a filter 15 which rejects substantially all wave lengths of light radiated from the sources 10 and 10'. The filter 15 is positioned adjacent an enclosure 16 and completely covers an aperture 17 in the surface of the enclosure 16 parallel to the plate or the surface 11. The enclosure 16 otherwise light-tight except for aperture 17 houses a detector 20 which may be a photoelectric cell. The detector is excited by the light radiated from the sample 12 passed by filter 15. Light in the visible spectrum and some radiation of longer wave lengths pass through filter 15. The aperture 17 is centered on the axis of the aperture 13. Similarly, the detector 20 is positioned on the axis for reception of the radiation.

In the preferred form of the invention, the sources 10 and 10' are also spaced equidistant from the axis. As will further be explained in connection with Figs. 2 and 4, it is preferred that they be distributed sources. A distributed source is used herein to mean a source having an areal distribution in a plane in the housing perpendicular to the axis of the aperture 13 equal to or greater than the area of the aperture 13. Such a distributed source will irradiate the sample aperture 13 from all directions as distinguished from a point source. Thus variations in the radiating surface of the sample 12 are effectively averaged so that for a given sample any orientation will excite the detector 20 to substantially the same extent as any other orientation, even though there are irregularities on the surface of samples not carefully prepared as by machining or other treatment.

The foregoing has briefly described certain features of the fluorometer. The D. C. amplifier system of Fig. 1 forming a portion of the fluorometer will now be described. The detector 20, a phototube, is connected by way of conductor 21 to a load resistor 22 and thence by way of conductor 23 to the positive terminal of battery 24. Conductor 25 connects the resistor 22 to the cathode of the phototube 20 thus completing the detector circuit.

The load resistor 22 is in the grid circuit of the input stage of a direct current feed-back amplifier 30. The amplifier 30 comprises tube 31 whose grid is connected to one terminal of load resistor 22. The cathode 32 is connected directly to ground, and the screen grid 33 is connected to the positive terminal of battery 34 and thence to ground. The anode circuit comprises the battery 36 and load resistor 37. The output of the tube 31 is directly coupled through battery 40 to the input grid 41 of the second tube 42 of the amplifier. The screen grid 43 is connected by way of the screen supply battery 44 to the cathode 46. The anode circuit of tube 42 includes the supply battery 50 whose negative terminal is connected to ground. The plate current path of tube 42 is completed to cathode through the ammeter 51 and the variable resistance 52. It is to be noted that ammeter 51, resistance 52 and grid biasing network 53 are also in the grid circuit of the input tube 31 and effectively form a feed-back loop. The bias of the tube 31 is controlled by variation of resistance 56 which controls the magnitude of the current flowing in the circuit 53. In accordance with feed-back theory, the current amplification of the whole amplifier is determined by the ratio of resistance 22 to the variable resistance 52. A circuit including battery 60 and resistance 61 is connected between ground and the cathode 46 of tube 42. The current flowing through meter 51 from battery 60 opposes the current flowing from the tube 42. Resistor 61 is chosen so that, for a given bias level on tube 31, the potential between ground and cathode 46 is zero and thereby the ammeter is made to read zero. Thereafter, any change in the potential across the resistor 22 will produce a substantially equal and opposite voltage across resistor 52. The magnitude of this unbalance as indicated by meter 51 is a measure directly proportional to the sample fluorescence.

Figure 2:
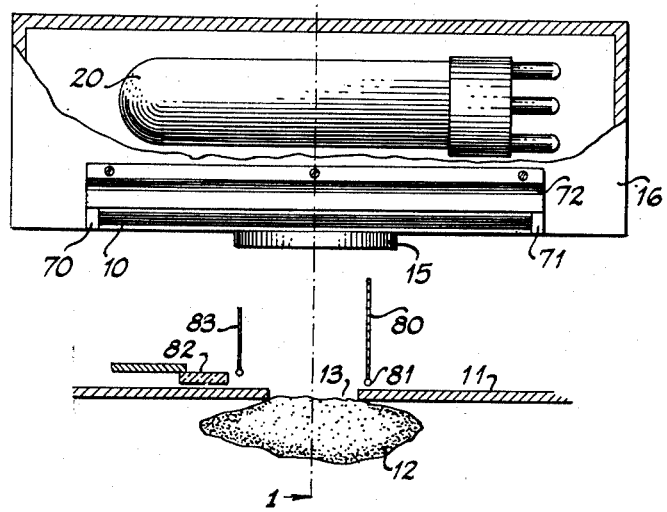
Fig. 2 is another view partially in section taken along the line 2—2 of Fig. 1.

Referring now to Fig. 2, the phototube 20 is shown in the cutaway portion of the enclosure or inner housing 16. The source 10 shown in this view is an elongated tube supported in brackets 70 and 71 fastened to the reflector 72 which is carried by the side of the housing 16. The tube 10 is a "black light" source extending on each side of the axis of the aperture 13 a distance considerably greater than the diameter of the aperture 13 and thus forms together with the tube 10' of Fig. 1 a source distributed in a plane parallel to the plane of the aperture 13 for irradiating the sample 12 from many directions. By so doing, the effect of irregularities in the surface of the sample 12 adjacent the aperture 13 is greatly reduced.

The fluorometer is further provided with a baffle 80 pivoted at 81 on the plate 11 for covering or closing the aperture 13 to eliminate entry of light from outside the housing. Additionally there is provided a calibrated standard 82 of some fluorescent material such as a piece of fluorescent glass. The standard is carried by the plate 11 adjacent the aperture 13. A hinged baffle 83 is also provided for covering the standard 82 to prevent radiation therefrom when desired. The fluorometer may then be calibrated in terms of the standard 82, as will be explained in connection with Fig. 5, so that for a plurality of readings of the sample 12 or for readings from a plurality of different samples placed in the same or different instruments constructed in accordance with the present invention the measured intensities will have a known relationship one with respect to the other.

Figure 3:
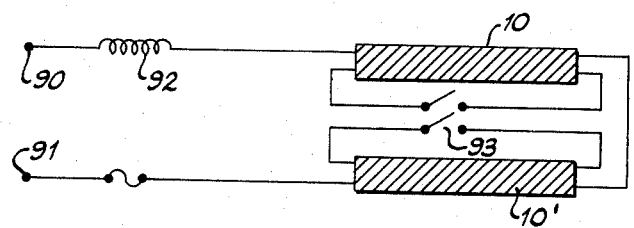
Fig. 3 is a circuit diagram for the source of light.

Fig. 3 illustrates diagrammatically the circuit for the sources 10 and 10' of Figs. 1 and 2. The sources may be fluorescent lamps which, as available commercially, are provided with a filter embodied in the glass envelope to pass light in the band centered in the region of 3600 angstrom units. The terminals 90 and 91 may be connected to a 110 volt source, A. C. or D. C., and thence by way of ballast 92 to the tube 10. The filaments of tubes 10 and 10' may be connected in series when switch 93 is closed to provide for initial heating of the filaments. When the switch 93 is opened, the arc is initiated and thereafter maintained in the tubes.

Figure 4:
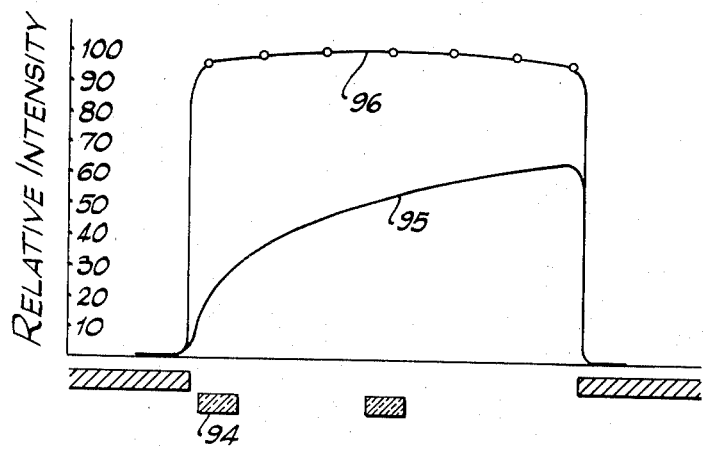
Fig. 4 is a plot of the photocell output for a plurality of positions in the sample aperture of a relatively small piece of fluorescent glass.

In Fig. 4 there has been plotted the intensity of fluorescence of a small piece of canary glass for each of a plurality of positions in the aperture 13 along the diameter perpendicular to the axis of the sources 10 and 10'. The curve 95 was obtained by first covering tube 10 so that only tube 10' effectively irradiated the aperture. A mirror image of this curve (not shown) was obtained when tube 10' was covered. The variation in response as indicated by the rapid increase in fluorescence as the sample 94 was moved to a position where the angle of incidence approached 90 degrees illustrates the necessity of a distributed source. The curve 96 was obtained by repeating the foregoing measurements with both sources 10 and 10' effectively irradiating the aperture. The response is substantially uniform for any postion within the aperture. This uniformity is possible by the use of a distributed source and by positioning the source such that it is symmetrical with respect to the axis of the aperture 13. Thus, any increase in the angle of incidence and distance with respect to one lamp is substantially completely compensated by a concurrent decrease in the angle of incidence and distance with respect to the other lamp.

Figure 5:
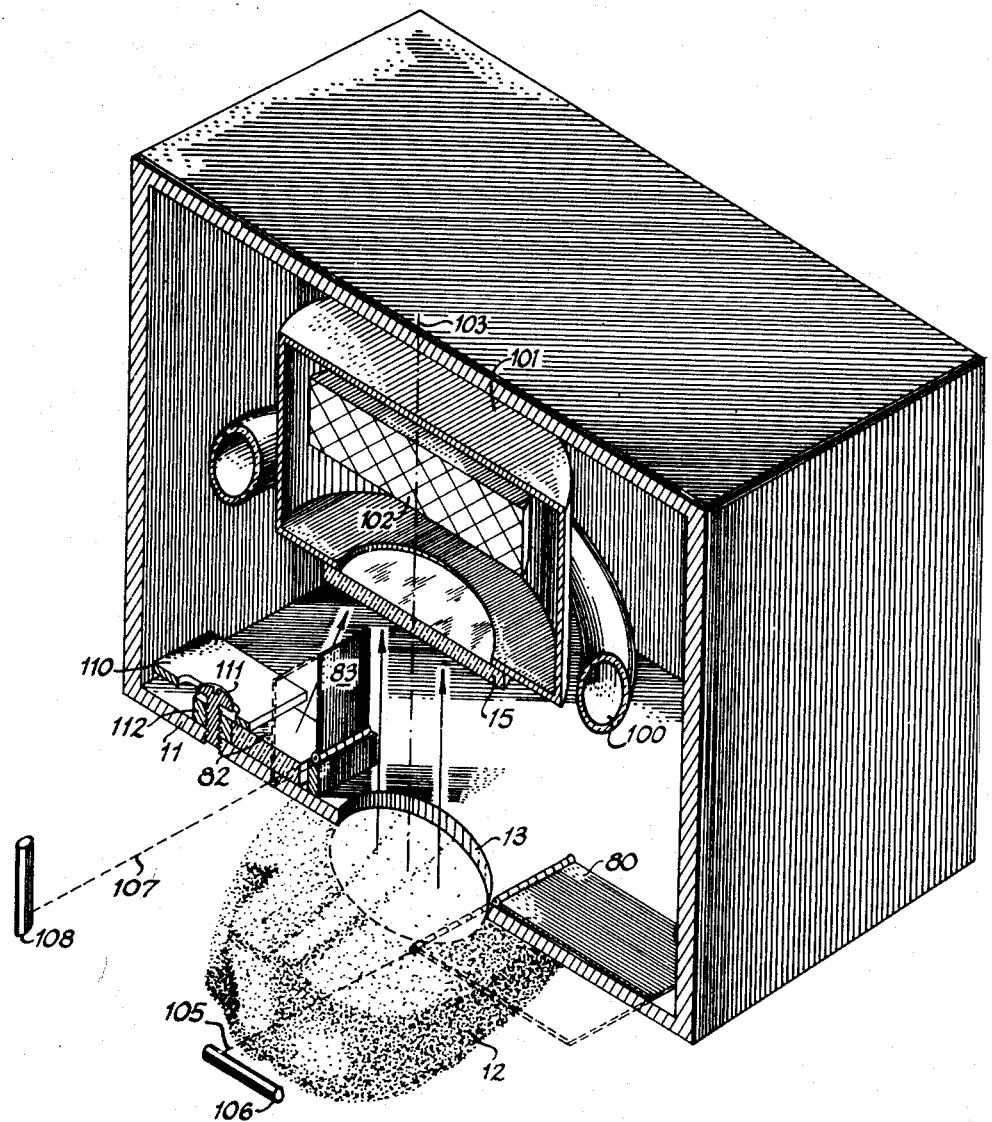
Fig. 5 is an isometric cut-away view of a modification of the fluorometer shown in Fig. 1 showing the rear portion of the outer housing, contents and omitting the front panel and the electrical circuits and associated parts.

Fig. 5 illustrates a further modification of the invention. Like parts have been given the same reference characters in Fig. 5 as in Figs. 1 and 2. In this modification a fluorescent "black light" tube 100 of circular shape is utilized as the source for exciting fluorescence of the sample 12. In this modification the source 100 encircles the housing 101 containing a photocell schematically illustrated by the cross-hatched disc 102. The source 100, housing 101, cell 102 and the filter 15 are all positioned or centered on the axis 103 of the aperture 13. Thus the sample is irradiated from all directions to provide complete compensation for variations in sample orientation.

Baffle 80 is illustrated in the open position of the aperture 13 and is controlled by way of a shaft 105 (dotted) which extends through the case, of which the plate 11 forms a part, and has on the extremity thereof a handle or other suitable control 106. The baffle 83 is illustrated in a position intermediate its open and closed position and has a shaft 107 (dotted) terminated in a handle or control 108 on the outside of the instrument case to facilitate operation. In this modification the calibrated standard 82 is fastened onto the plate 11 adjacent the aperture 13 and is provided with a slotted cover 110 which may be slidably positioned under screw 111 which threadedly passes through the slot in cover 110 and then through a block 112 into the plate 11. Variation of the position of the plate 110 will determine the area of the standard 82 and thus may be used in the initial calibration of the instrument.

To place the instrument in operation, the following steps may be followed. The area of the calibrated standard 82 to be exposed in a particular instrument will depend upon the intensity of radiation that will be received from samples that are to be studied. To determine the area of the standard to be used, a plurality of samples of, for example, well cuttings, well cores, and rock samples successively may be placed near the aperture 13. With the standard covered by baffle 83 and the aperture opened, a range of values of fluorescence subsequently to be measured will be obtained which define the desired range of the instrument. In a system such as illustrated in Fig. 1 where for the sake of simplicity the instrument is provided with but one range of sensitivity (which obviously might be altered by placing shunt resistances of known values across the meter 51) the fluoresence from standard 82 should be of such intensity as to exceed that from any of the samples to be measured. Thus, in the system of Fig. 1, it is desirable to have the standard of such an area that the calibration of the instrument will be made at full scale of meter 51 and that a majority of measurements of samples will be at or near midscale deflection. This will permit the measurement of samples having fluorescence both stronger and weaker than the average values. The aperture 13 may then be closed, the standard 82 exposed to radiation and the plate 110 (Fig. 5) adjusted in position, covering a greater or smaller area of the standard, until radiation is near or at the upper extreme of the range indicated by the samples to be studied. A plurality of such fluorometers may then be calibrated to the same point so that readings from such instruments may be compared directly.

After the area of the standard has been adjusted, the meter is ready for use and its operation is as follows. Baffle 80 is placed over the aperture 13 and baffle 83 is placed over the standard 82. The amplifier comprised of tubes 31 and 42 is energized and adjusted by variation of resistor 56 for zero deflection of meter 51. Baffle 83 is then opened for detection of the fluorescence from the standard 82 by the cell 20, and resistance 52 is adjusted to the proper scale deflection of the meter 51. Baffle 83 is then moved to cover standard 82, a selected sample 12 is placed adjacent the aperture 13 and the baffle 80 moved to open the aperture. The deflection of the meter 51 will be directly proportional to the fluorescence of the sample 12 and the ratio of the fluorescent properties of the sample 12 to the standard 82 is directly proportional to the deflection of the meter 51 for the two readings. If meter 51 is graduated from zero to one hundred, calibrations preferably will be made at full scale whereupon the deflection produced by a sample will be a direct reading of the desired ratio. Calibration of the fluorometer each time it is used provides a means whereby different samples may be compared in their fluorescent properties independently of such variables as voltages in the amplifier, etc., which are peculiar to each instrument, particularly in case of a field instrument where variations in the power sources are inherent.

The following parameters used in one form of the invention are given by way of example:

Tubes 20, 31 and 42: 929, 1LB4, and 3Q5, respectively
Batteries 24, 34, 36, 44: 45 volts
Batteries 50 and 60: 22½ volts
Battery 40: 13½ volts
Resistor 22: 1000 megohms
Resistor 37: 1000 megohms
Resistor 52: 20,000 ohms
Resistor 56: 120,000 ohms
Resistor 61: 10,000 ohms It should be understood that the invention is not limited to the particular arrangements specifically described but that changes and modifications within the scope of the appended claims will be made.

What is claimed is:

1. In a fluorometer having a housing light-tight except for a sample receiving aperture in one face thereof, the combination which comprises a light sensitive device in said housing positioned axially of said aperture, a distributed source of ultraviolet light in said housing and positioned in a plane perpendicular to said axis for uniform radiation of the sample placed in said aperture, means for excluding from said light sensitive device, radiations from said sample and from said source, of wave lengths emitted by said source, and means for measuring the response of said light sensitive device upon irradiation of samples in said aperture by light from said source.

2. In a fluorometer having a light-tight housing except for a sample receiving aperture in one surface thereof, the combination of a fluorescent standard within said housing and adjacent said aperture, baffle means within said housing selectively for covering said aperture and said standard having control means extending exteriorly of said housing, a photocell within said housing positioned axially of said aperture, a source of ultraviolet light within said housing for irradiating said standard and said sample, and means for indicating the output of said photocell for measurement of the ratio of the fluorescence of said sample to the fluorescence of said standard.

3. In a fluorometer having a housing light-tight except for a sample receiving aperture in one face thereof, the combination which comprises a light sensitive device in said housing positioned axially of said aperture, a distributed source of ultraviolet light in said housing and positioned in a plane perpendicular to said axis for uniform radiation of the sample placed in said aperture, means for excluding from said light sensitive device radiations from said sample and from said source of wave lengths emitted by said source, and circuit means connected to said light sensitive device for measuring the intensity of fluorescence from samples in said aperture upon irradiation by light from said source.

4. In a fluorometer having a housing light-tight except for a sample receiving aperture in one surface thereof, the combination of a fluorescent standard within said housing and adjacent said aperture, baffle means within said housing selectively for covering said aperture and said standard, said baffle having means extending exteriorly of said housing for controlling the position thereof, a photocell within said housing positioned axially of said aperture, a source of ultraviolet light within said housing for irradiating said standard and said sample, and a circuit connected to said photocell for measuring the output thereof.

5. In a fluorometer having a housing which is light-tight except for an aperture in one surface thereof, a combination which comprises baffle means within said housing having control means extending exteriorly thereof for closing said aperture, a calibrated fluorescent standard within said housing and adjacent said aperture, baffle means having control means extending exteriorly of said housing for covering said standard, a photocell within said housing and positioned axially of said aperture, a distributed source positioned within said housing in a plane parallel to said surface for subjecting said aperture to uniform radiation, and means for measuring the intensity of fluorescence of said sample and said standard as detected by said photocell.

6. In a fluorometer having a housing which is light-tight except for an aperture in one surface thereof, a combination which comprises baffle means within said housing having control means extending exteriorly thereof for closing said aperture, a calibrated fluorescent standard within said housing and adjacent said aperture, baffle means having control means extending exteriorly of said housing for covering said standard, a photocell within said housing and positioned axially of said aperture, a circular fluorescent source of ultraviolet light positioned within said housing coaxially of said aperture and in a plane parallel to said surface for subjecting said aperture to uniform radiation, and means for measuring the intensity of fluorescence of said sample and said standard as detected by said photocell.

7. In a fluorometer having a housing with a sample receiving aperture in one surface thereof and a photocell therein positioned axially of said aperture with a light filter for preventing passage to said photocell of all wave lengths shorter than visible light, the improvement which comprises a calibrated fluorescent standard within said housing and adjacent said aperture, a distributed source of ultraviolet light symmetrically positioned with respect to the axis of said aperture in a plane parallel to said surface for irradiating said standard and samples positioned adjacent said aperture and means for measuring the ratio of the output of said photocell in response to radiations from said standard and from said samples.

8. In a fluorometer having a housing light-tight except for a sample receiving aperture in one surface thereof, the combination of a fluorescent standard within said housing and adjacent said aperture, baffle means within said housing selectively for covering said aperture and said standard having control means extending exteriorly of said housing, a photocell within said housing positioned axially of said aperture, a source of ultraviolet light within said housing for irradiating said standard and said sample, circuit means connected to said photocell having current indicating means in the output thereof, gain controlling resistance means in said circuit for adjusting the zero on said current indicating means when both said aperture and said standard are covered, a variable feed-back resistance means for adjusting the full scale deflection of said current indicating means when said standard is uncovered, whereby the deflection of said current indicating means upon excitation of said photocell by radiation from said sample will be proportional to the ratio of the fluorescence of said sample to the fluoresence of said standard.

9. In a fluorometer having a housing which is light-tight except for an aperture in one surface thereof and a photocell within said housing positioned axially of said aperture, the combination which comprises a calibrated fluorescent standard within said housing and adjacent said aperture, a source of ultraviolet light for irradiating said surface of said housing which includes said aperture and said standard, a feed-back amplifying circuit connected to said photocell for measuring the excitation thereof and having an ammeter in the feed-back loop, a baffle for covering said standard having control means extending exteriorly of said housing, variable bias means in said amplifier circuit for adjusting the current in said feed-back loop to zero when said baffle covers said standard variable resistance means in said feed-back loop for adjusting the full scale deflection of said meter when said photocell receives radiation from said standard, and baffle means for controlling said aperture whereby a sample placed adjacent said aperture will excite said photocell and produce a deflection on said meter directly proportional to the ratio of its fluorescence to the fluoresence of said standard.

10. In a fluorometer having a housing with a sample receiving aperture in one surface thereof and a photocell therein positioned axially of said aperture with a light filter for preventing passage to said photocell of all wave lengths shorter than visible light, the improvement which comprises baffle means within said housing having control means extending exteriorly of said housing for closing said aperture, a calibrated fluorescent standard within said housing and adjacent said aperture, baffle means for covering said standard, a distributed source of ultraviolet light positioned in a plane parallel to said surface for irradiating said standard and samples positioned adjacent said aperture when said baffles are removed, a feed-back amplifier connected to said photocell having a meter in the feed-back path thereof, gain control means in the grid circuit of said amplifier for adjusting for zero feed-back current when both said aperture and said sample are covered, and variable resistance means in the feed-back loop for adjusting said current for full scale deflection of said meter when said standard is exposed to radiation whereby radiation from said sample alone will produce a deflection on said meter due to said feedback current directly proportional to the ratio of the fluoresence of said sample to the fluoresence of said standard.

11. A fluorometer comprising a housing which is light-tight except for a sample receiving aperture in one face thereof, a light sensitive device in said housing positioned axially of said aperture, a distributed source of ultraviolet light in said housing and positioned in a plane perpendicular to said axis for uniform radiation of the surface of a sample placed in said aperture, means for excluding from said light sensitive device radiations from said sample and from said source of wave lengths emitted by said source, and means for measuring the response of said light sensitive device upon irradiation of samples in said aperture by light from said source.

12. A fluorometer comprising a housing which is light-tight except for a sample receiving aperture in one face thereof, a light sensitive device in said housing positioned axially of said aperture and a source of ultraviolet light in said housing in a plane perpendicular to said axis having an areal distribution equal to or greater than the area of said aperture for uniform radiation of the surface of a sample placed in said aperture, and means for measuring the response of said light sensitive device to visible light from said sample upon irradiation thereof by said source.

13. A fluorometer having a housing which is light-tight except for a sample receiving aperture in one face thereof, a light-sensitive device in said housing positioned axially of said aperture, a source of ultraviolet light having an areal distribution in a plane within said housing perpendicular to said axis equal to or greater than the area of said aperture for uniform radiation of the surface of a sample placed in said aperture, means for excluding from said light sensitive device radiations from said sample and from said source of wave length emitted by said source, and circuit means connected to said light sensitive device for measuring the intensity of fluorescence in the visible spectrum of said sample upon irradiation by ultraviolet light from said source.

ELLIS E. BRAY.

REFERENCES CITED

The following references are of record in the file of this patent:

UNITED STATES PATENTS

| Number | Name | Date |
| --- | --- | --- |
| 2,217,991 | Peck et al. | Oct. 15, 1940 |
| 2,363,600 | Lawlor | Nov. 28, 1944 |
| 2,478,745 | Cornwall | Aug. 9, 1949 |
| 2,459,512 | Fash et al. | Jan. 18, 1949 |